US006780106B2

(12) United States Patent
DeMar et al.

(10) Patent No.: US 6,780,106 B2
(45) Date of Patent: Aug. 24, 2004

(54) GAMING MACHINE SOUVENIR

(75) Inventors: Lawrence E. DeMar, Winnetka, IL (US); Scott D. Slomiany, Streamwood, IL (US); Duncan F. Brown, Grayslake, IL (US)

(73) Assignee: Case Venture Management, LLC, Wheeling, IL (US)

(*) Notice: Subject to any disclaimer, the term of this patent is extended or adjusted under 35 U.S.C. 154(b) by 0 days.

(21) Appl. No.: 09/912,097

(22) Filed: Jul. 24, 2001

(65) Prior Publication Data

US 2003/0022710 A1 Jan. 30, 2003

(51) Int. Cl.[7] ........ A63F 13/12
(52) U.S. Cl. ........ 463/16; 283/77
(58) Field of Search ........ 283/77; 463/16

(56) References Cited

U.S. PATENT DOCUMENTS 4,553,748 A * 11/1985 Allen et al. ........ 463/30
4,689,742 A * 8/1987 Troy et al. ........ 463/25
4,865,351 A * 9/1989 Smithson et al. ........ 283/58
5,397,125 A * 3/1995 Adams ........ 463/20
5,882,258 A 3/1999 Kelly et al. ........ 463/11

FOREIGN PATENT DOCUMENTS

EP 0992266 A2 * 12/2000

* cited by examiner

*Primary Examiner*—Mahmoud Gimie
*Assistant Examiner*—Arnold Castro
(74) *Attorney, Agent, or Firm*—Baniak Pine & Gannon

(57) ABSTRACT

A system, method and apparatus by which a souvenir that memorializes that which a player was able to accomplish from using a gaming machine can be easily and effectively produced. In a preferred embodiment, the system permits the substance of the souvenir to be selected, the form or forms in which the souvenir is provided to be selected, and the manner in which the souvenir is distributed to be selected. More specific preferred embodiments permit the system operator to pre-select the event for which a player can receive a souvenir, the substance of the record from which the souvenir may be generated, and/or whether and to the extent to which the player may add to the record to produce the souvenir.

66 Claims, 3 Drawing Sheets

GAMING MACHINE SOUVENIR

FIELD OF THE PRESENT INVENTION

The present invention generally relates to gaming machines. More particularly, the invention relates to a system, method, and apparatus by which a souvenir that memorializes that which a player was able to accomplish from using a gaming machine can be easily and efficiently produced.

BACKGROUND OF THE INVENTION

A variety of machines are known that allow individuals to play a game for money and that, depending on the result, may provide the player with a valuable return, such as money. These gaming machines include those known as slot machines, in which a player enters a wager, such as putting money into the machine or have an account debited in order to play each game, and that shows the result of the game after its conclusion, as on a display or other visualization. Depending on the type of machine, the displays may inform the player of the result of the game through images shown on a video monitor, such as "video slot reels," or through a combination produced as a result of the mechanical operation of spinning reels, or other mechanical devices.

Players who play gaming machines largely do so with the hope of receiving something of value, and in particular winning what is perceived to be a big prize whether it be money, a prize such as a car, and so on. Players refer to winning a big prize as "hitting the jackpot." Because of the relative infrequency at which the event occurs, hitting a jackpot often produces a major positive memory for a gaming machine player. The event also is an occasion that the operator, or the manufacturer of the gaming equipment, or others, may wish to publicize and/or use for promotional purposes. When the jackpot is large (such as over $10,000 in value), the establishment or equipment manufacturer may wish to take additional steps to memorialize the event, such as by taking a photo of the player standing alongside the machine that produced the winning game while being handed an oversized check showing the amount won.

Gaming machines also typically permit players to win smaller jackpots with greater frequency than the larger jackpots, such as what is known as a "4000 coin Royal Flush" on a video poker machine or the top award on a slot machine that is not connected to a progressive network. Because of the relative infrequency at which they occur, even hitting a smaller jackpot may produce a major positive memory for a gaming machine player. While the winning of a smaller jackpot may not draw the same attention of the operator (or others) that the winning of a larger jackpot does, either event may be perceived as once in a lifetime events for the player. Players may wish to have some record that memorializes such an event. The operator or the manufacturer of the machine on which the game was won, or other interested parties, may wish to permit the production of such a record that memorializes the event, termed a "souvenir" for purposes of this application, even for the winning of the smaller jackpots.

The gaming machine industry is highly competitive and there is a continuing need for gaming machines with enhancements that may attract players by enhancing the entertainment value and excitement associated with the game. It would therefore be desirable to have a way to provide a souvenir that memorializes the occurrence of a significant event, such as the winning of a jackpot on a gaming machine. The present invention satisfies this demand.

SUMMARY OF THE INVENTION

The present invention is directed to a system, method, and apparatus by which a souvenir is produced of what a player was able to accomplish as the result of playing a gaming machine, such as the player's winnings on the machine.

In a preferred embodiment, the invention permits the substance of the souvenir to be selected, the form or forms in which the souvenir is provided to be selected, and the manner in which the souvenir is distributed to be selected. With respect to this preferred embodiment, and in particular the substance of the souvenir to be selected, the program permits the system to be configured such that the operator of the machine can pre-select the event for which the player can receive a souvenir. The event may be defined, for example, in terms of the player's accomplishments—such as the size of the jackpot won by the player—and in terms that may be important to the operator—such as the number of games played on the certain machine (for example, the millionth game played on a certain machine), or the number of players that have visited and played a game at the establishment (the millionth game played on the establishment's machines), just to name a few such memorable events. The event may also be defined as a "result" type, such as "Royal Flush" or "Four Deuces" on a video poker machine. For purposes of this application, the term "operator" is meant to refer to that individual or entity that has the right to control the settings of the gaming machine and may be, for example, the one who collects the revenue from or has an interest in the operation of the machine, such as the establishment where the machine is located, e.g., a casino. The term "event" is meant to include an occurrence that the operator may wish to recognize and/or the player may wish to memorialize, such as the winning of a jackpot; and the term "jackpot" is meant to include anything of value that may be won through the playing of a game on a gaming machine.

Certain embodiments of the invention permit the operator to pre-select the history of the event to be recorded upon the happening of an event threshold. With respect to the production of this historical record of the event, the operator may choose to record, for example, the size of the jackpot, the machine on which the jackpot had been won, the location of the machine, the size of the jackpot, the date and time on which the jackpot had been won, but, as a minimum, preferably includes a reproduction or recreation of the gaming machine display by which the player was informed that he or she had won.

A preferred embodiment permits the operator to select the substance of the historical record as well as whether all or a subset of the historical record is made available for purposes of producing the souvenir. Whether the operator permits the entire or just a subset of the historical record to be accessed for purposes of producing the souvenir, this operator-selected record is termed the "publishable record", and includes the reproduction or recreation of the winning display, but possibly additional elements from the historical record such as, but not limited to, the name of the establishment where the machine was located and the manufacturer of the gaming machine. Information from the historical record that the operator may wish to withhold for purposes of publication may include, for instance, information that is necessary for accounting or tax purposes.

Additionally, embodiments can be configurable such that the operator may add to or permit the player to add to the publishable record to produce a "refined" publishable record. To illustrate, while the operator may have chosen that the publishable record includes only the reproduction or recreation of the game winning display, the operator may wish to allow the player to add information to further personalize and increase the memorial value of the souvenir. Such personalization information may include, but is not limited to, the name of the person as entered by the player, or imagery such as a photograph of the player showing the player's reaction after being informed that he or she had just won, or stock imagery elements such as a printed frame surrounding the game winning display reproduction/recreation, or a picture of the establishment where the game was won. The photograph of the player may be obtained through the use of a camera forming a part of the system that is synchronized to take a photograph of the player, such as when the player is standing in front of the machine. Similarly, the player may opt to remove elements from the operator's specified publishable record, to suit the player's taste.

Once the event occurs, the gaming machine could be set by the operator to generate the souvenir only if other action is taken by the player or operator, or alternatively automatically upon occurrence of the event. Regarding the former, one embodiment of the software permits the souvenir to be generated upon the entry of a command by an employee of the operator. For example, since gaming machine jackpots are often paid to the player as a "hand pay", that is, an employee of the gaming machine operator verifies the win and pays the player in cash instead of through the dispensing of coins by the machine, the attendant required for the hand pay can easily enter in the system the souvenir generation command thereby causing the system to produce the winner souvenir. Regarding the latter, as an alternative, a player who has caused a souvenir dispensing event is notified that the player may choose to produce a souvenir. The notice may be provided visually, such as on the machine or elsewhere and/or as an aural cue to the player, inquiring whether the player wishes to obtain a souvenir such as the printout and inform the player what, if any, choice the player has with respect to the information to be included on the souvenir. Choices for information on the souvenir may be limited to that which is in the publishable record or the refined publishable record as described above.

Embodiments of the invention are further configurable such that the form or forms in which the souvenir is provided is selectable. In one such preferred embodiment, the operator may select the form or forms in which the souvenir is produced. In addition or alternatively, the software may be configurable such that the operator permits the player to select from a group of forms in which the publishable record is provided. For example, with respect to those embodiments of the system of this invention that include a printer component, the operator may configure the software such that a printer prints out the souvenir. Depending upon the substance of the publishable record or refined publishable record, in a gaming machine having a video monitor to display the gaming results, the souvenir may be an exact replica of the screen showing the award and possibly other information, such as the payout and the identity of the establishment where the game was won. Preferably, the printer component of the system is a color printer such as an ink jet, dye sublimation, or other photo-grade printer. However, certain embodiments may use a lower resolution color or black and white printer such as a dot-matrix or thermal printer. Because embodiments that include lower resolution color or black and white printer components may not be able to produce a suitable reproduction of the video monitor display of the winning result (as well as embodiments that don't use a video display but, for example, mechanical spinning reels), the souvenir printout will be a recreation that is representative of the winning display instead of exactly reproducing or matching the display that the player observed. Certain gaming machines already contain printers for other functions, such as printing out vouchers as an alternative to dispensing coins; configuring the machine printer so that the publishable record or refined publishable record is printed out on the same printer to produce the souvenir will result in cost efficiencies. Such printers may be generally adjacent to the location of the gaming machine (or in the machine itself) to facilitate quick access thereto, or may be situated in a remote location. With respect to the latter embodiment of the printer, the software may be configurable such that the publishable record or refined publishable record along with the print order is transmitted to the printer for the production of the souvenir. In the physical souvenir embodiments, the souvenir is not limited to a paper printout, but may be in any tangible form (such as engraved into metal, etched on glass, etc.).

A preferred embodiment permits the manner in which the souvenir is distributed to be selected. With respect to those embodiments that include printer components, depending upon the location of the printer, the print version of the souvenir may be provided to the player generally immediately after the event or some time later. For example, in those embodiments of the system that include a printer positioned generally adjacent to the location of the gaming machine on which the winning event was recorded, the print version of the souvenir may be handed to the player by the employee that ordered its production, or in those embodiments providing such a feature, may be picked up by the player. In those embodiments that include a souvenir generation printer situated in a remote location, the player may be given the souvenir at some later time or through a delivery service such as the mail. Requiring the player to pick up the souvenir from the operator is advantageous since the operator may wish to take a photograph and/or use the name of the player for subsequent promotional purposes, and at that time may request the player to sign a release for such purposes. With respect to those embodiments of the system of this invention that include a gaming machine that is connected to the internet and/or to an intranet, an operator may choose to provide the souvenir in digital form through such a distribution system to the player as any email may be sent. The player may then access the record through the player's computer or another's computer for the player and, if the player so chooses, print out the record. The distribution of the digital form of the publishable or refined record through these embodiments is facilitated by the online system that operators employ to connect all or most of their gaming devices. Such online systems typically form a local area network in a casino by which each gaming machine is connected to various servers and access stations that are used to monitor the machines and administer "Slot Clubs" that track the player's play and offer awards in a manner similar to "Frequent Flyer" programs. Typically, each gaming machine is connected to the online network through a serial port in the slot machine over which data may be sent in both directions. Other networking technologies may be used such as Ethernet or modem to connect each machine to the network. Where the digital file is to be sent can be determined by an operator's employee who asks the player for this information, enters it, and triggers the distribution of the record as requested by the player. With less or no interaction of an employee of the operator with the player, the system may provide to the player a visual and/or aural query after the occurrence of the event. The player may be asked to enter the player's name and/or email address or addresses to which the player wishes the digital publishable record or refined publishable record to be sent. With respect to players that are known by the operator, such as because they have an account with the operator, a player may simply need to provide the name or account number, and the email address may be obtained from the player's account information. This information may also be read automatically from a player-tracking card, if present.

Other preferred embodiments include a central server that is capable of constructing a souvenir from a library of information such as data and images stored there. The server can then dispatch a record of the constructed image (as discussed above) to a printer, or in digital form such as for transmission to or for the player.

A principal object of the present invention is therefore to provide a system by which a souvenir of an event that has occurred as a result of playing a game on a gaming machine may be produced. Commensurate with the above, yet another principal object of the present invention is to provide a method and apparatus by which souvenirs from gaming machines can be provided to players that, for example, have won a jackpot. Another object of the present invention is to provide such a system and method that provide a souvenir that includes a reproduction or recreation of the display of the gaming machine by which a player was first informed that, for example, the player has won something of potential significance.

An additional object is to provide a system and method that include configurable software that permits selection of the form or forms in which the souvenir is provided. An added object of the present invention permits an operator to select the manner in which the souvenir is distributed to the player.

These, together with other objects and advantages will be further understood in the details of the construction and operation of the invention as more fully hereinafter described, reference being had to the accompanying drawings, forming a part hereof, wherein like numerals refer to like part throughout.

DESCRIPTION OF PREFERRED EMBODIMENTS

Figure 1:
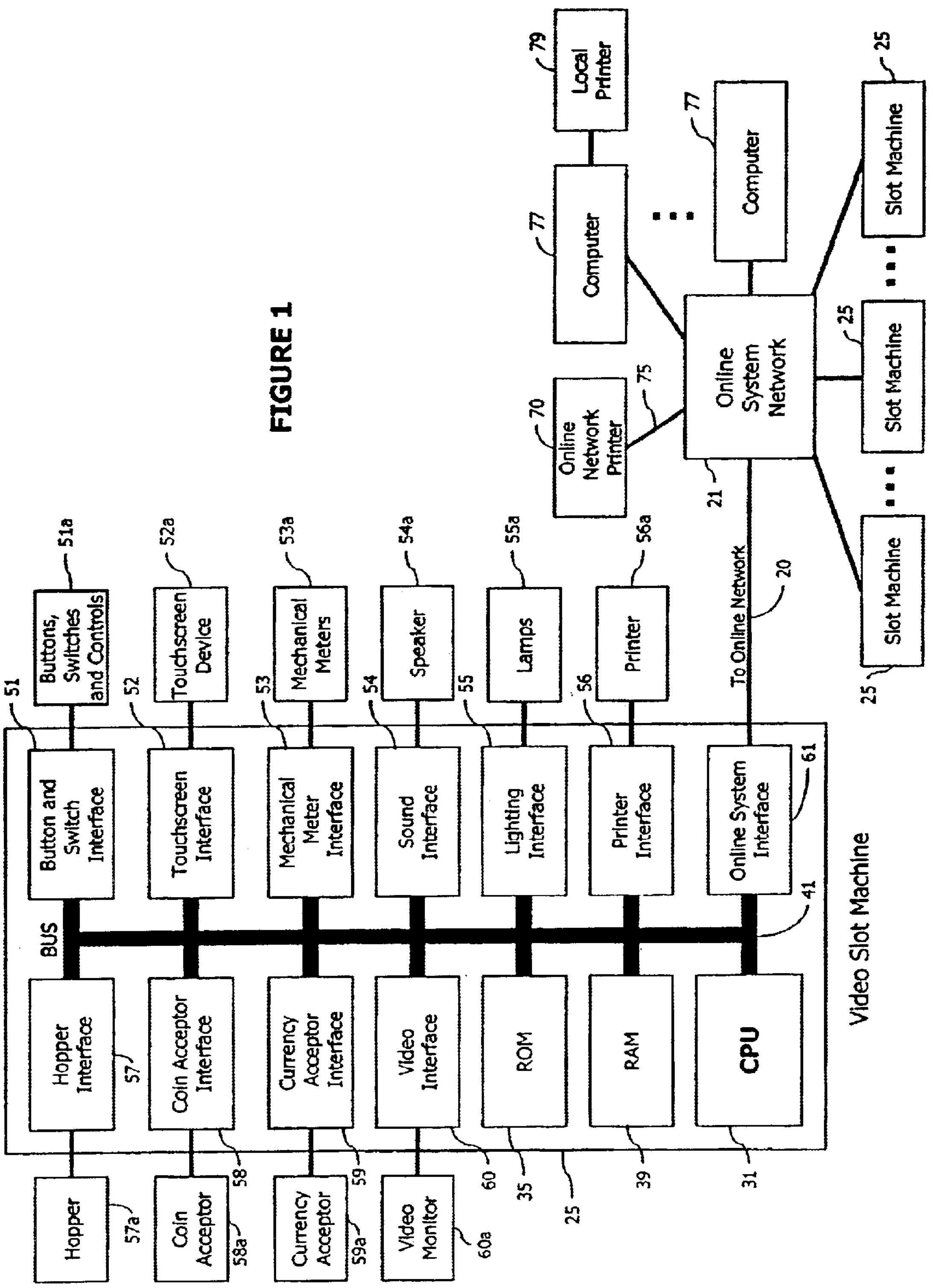
FIG. 1 is a block diagram of an embodiment of the present invention that includes a gaming machine having a video monitor as a display.
Figure 2:
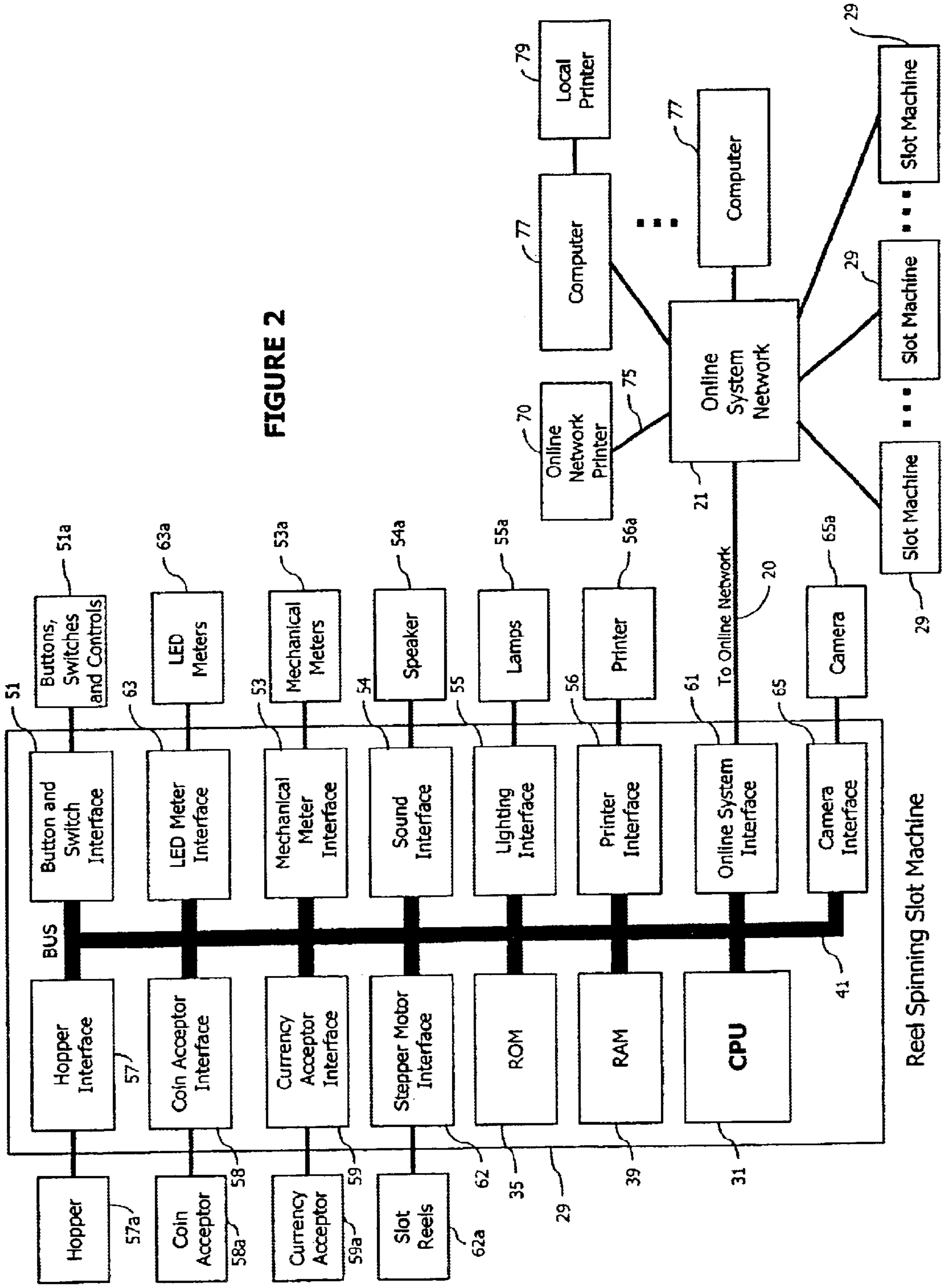
FIG. 2 is a block diagram of another embodiment of the present invention that includes a gaming machine known as a mechanical spinning reel slot machine.

FIGS. 1 and 2 show a method, apparatus and system for playing a game which provides a souvenir upon the occurrence of a significant event, such as winning a predetermined size jackpot. The FIG. 1 embodiment in broad overview is one that includes components that form a gaming machine that provides information to a player regarding the status of the game largely though the display on a video monitor 60*a*. For purposes of this embodiment, the gaming machine is termed a video slot machine 25. An online system network 21 is connected to the machine 25 through a connection 20 in a manner that is well known in the art.

The FIG. 2 embodiment, in like broad overview, includes components that form a gaming machine which provides information to a player regarding the status of the game largely through a display that includes mechanical slot reels 62*a*, and for purposes of this application will be termed a spinning reel slot machine 29. In a typical configuration, video slots 25 and actual reel slots 29 are both connected to an online system network. An online system network 21 is connected to the machine 29 through a connection 20 in a manner that again is well known in the art.

As will be readily recognized, this invention can be adapted to other types of gaming machines, and indeed other potential applications.

Both the FIG. 1 embodiment and the FIG. 2 embodiments include a central processing unit ("CPU") 31 that executes configurable software stored in either read-only memory ("ROM") 35 or random-access memory ("RAM") 39 which is accessed via a common bus 41 composed of standard address and data lines. The FIG. 1 embodiment also includes interfaces 51 through 60 for respective peripheral devices for sound (speaker 54*a*), switches, buttons and controls 51*a*, mechanical meters 53*a*, currency acceptor 59*a*, coin acceptor 58*a*, hopper 57*a*, monitor 60*a*, touchscreen 52*a*, printer 56*a* and lamps 55*a*. The online system network 21 has interface 61. Rather than having peripherals interfacing through a main bus 41 as do the illustrated embodiments, certain embodiments of the system may include private buses for certain peripherals or groups of peripherals. Other implementations may provide serial or parallel or other standard communication methods as the interface means for the various peripherals.

The configurable software contemplated herein permits an operator to pre-select the souvenir generation event, the substance of the information contained on the souvenir, the form or forms in which the souvenir is provided, and the method by which the souvenir is distributed to the player. Such pre-selection can occur, for example, by making the appropriate selections prior to the loading of the software into the system, or by the interaction of an employee of the operator with a menu presented on the screen in those embodiments including a video monitor 60*a* with a touch screen device 52*a*, or using menus presented on LED displays and buttons on embodiments that do not have a monitor. Furthermore, such adjustment may be made to the games through instructions sent to the games over the online system, as is well known in the art. The following describes the various components of the present invention including the pre-selection options offered by the configurable software.

With respect to the pre-selection of the souvenir generation event, the operator may choose to make a souvenir available upon the occurrence of one or more events, and taking into consideration a variety of factors such as the nature of the gaming machine that forms a part of the system, the amount that the player must spend to play any one game, and the location of the machine. For example, the operator may define the event by a dollar amount threshold set by the operator such that the souvenir would be available for any single game win that is equal to or higher than the threshold. One typical setting for the threshold may be $1000, such that a player who wins $1000 or more in a single play of the machine could receive a souvenir memorializing the achievement. On a machine that takes coins to initiate play with a top award of a certain large number of coins, a souvenir may be made available when a dollar amount equivalent to the number of coins is won. For a machine that takes nickels to initiate play, the threshold may be set, for example, at $500 such that a player that wins a top award, say of 10,000 nickels, receives a souvenir of the event.

On a gaming machine such as the video slot machine 25 on which the game "Dollar Deuces Wild" may be played and that may award, for example, $4000 for a Royal Flush and $1000 for four deuces, the operator may set the threshold at greater than $1000, so that a souvenir is generated only when the outcome is, and the video monitor 60*a* displays, a Royal Flush providing the player with a win of $4000 in this example. Alternatively, it may be set to award the souvenir for four deuces or a royal flush. In this case, the operator may choose the event to be based on the hand rather than jackpot amount, so that if the player achieved a royal flush with only one coin bet, the $250 win would still generate a souvenir, just as the $4000 win does when a royal flush is hit with five coins bet. This invention may provide souvenirs upon the occurrence of other events set by the operator, such as the number of games played on a certain machine or the number of players that have visited and played a game at the establishment, just to name two situations.

Figure 3:
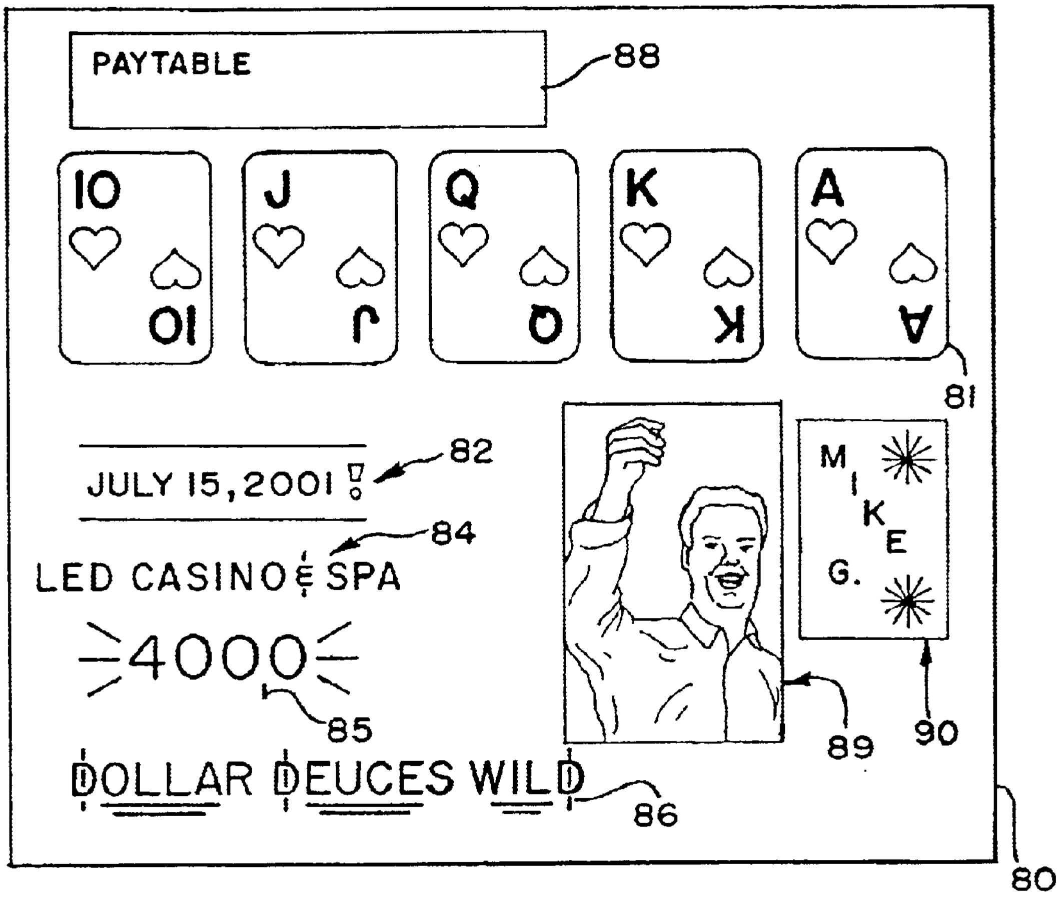
FIG. 3 is a souvenir made in accordance with various aspects of the present invention.

FIG. 3 shows just one example of a souvenir record that could be made in accordance with this invention. Souvenir 80 is a printed document which reproduces the royal flush winning hand 81 as actually displayed on the video monitor of the machine. The date of the event 82 has been provided as a field along with the place 84 and the amount of the jackpot 85. The type of machine (game) is displayed as a field at 86. This souvenir further includes a reproduction of the paytable 88, and a photographic image of the player 89 along with the player's name 90.

With respect to the pre-selection of the information that is carried on the souvenir, the invention permits the operator to select what, if any, information that is specific to the event realized by the player's interaction with the machine 25 that the operator may wish to retain, as well as provide on the souvenir 80. Such a historical record of the event may, as just illustrated, include the size of the jackpot prize, the date and time on which the jackpot had been won, the machine on which the jackpot had been won, and the location of the machine. As a desired minimum, however, it includes a reproduction or recreation of the gaming machine display 81 by which the player was first informed that he or she had won the jackpot. Such a historical record may be retained in the RAM 39.

Preferred embodiments permit the operator to select the publishable record from the historical record; that is, whether all or, if not all, what portion of the historical record is made available for purposes of producing the souvenir. The operator may wish to retain for its own use and not make available for publication purposes certain components of the historical record. As an example, the operator may wish to withhold the name of the manufacturer of the machine on which the event had been recorded but make available as a publishable record only the reproduction or recreation of the winning display.

Preferred embodiments permit the operator to select whether the operator and/or the player may add to the publishable record to produce a refined publishable record. For example, the operator may wish to permit the player to add his or her name to the publishable record such that the souvenir includes such name. In those embodiments of the machine that include a camera 65*a* synchronized with the system via interface 65 (FIG. 2) to take a picture upon the occurrence of the event, the operator may wish to permit the player to add such image to the publishable record for purposes of producing the souvenir.

The photographic record could be taken by a digital camera mechanism included on or in the gaming machine. Other types of photographic apparatuses could also be readily employed, including a video camera for a short video clip. Activation of the camera may occur automatically upon the machine's identification that a jackpot has been won or upon entry of a command (e.g., a "start photo" sequence button) so that the player is ready for this bit of posterity.

Preferred embodiments of the system permit the operator to select whether the souvenir is generated only if other action is taken by the operator and/or the player that could be the entry of a souvenir generation command by either an employee of the operator and/or the player thereby causing the system to produce the souvenir, or automatically upon occurrence of the event.

The preferred embodiment is further configurable such that the operator may select the range of form or forms in which the souvenir may be provided, and may select whether to provide the player with a choice of the souvenir. For example, the system may include configurable software that permits the operator to select whether to make a hard copy of the souvenir, such as one printed on a computer at the establishment where the event was realized, or a digital version of the souvenir, such as one sent via an online distribution system to the player. A hard copy may be produced on media other than paper (such as engraving in metal or etching on glass, etc.). The souvenir may be reproduced on a drinking utensil, ceramic mug, an article of clothing, a T-shirt, keychain, paperweight, a decorative item, poster, plaque, post card, toy, hat, ashtray, and so on.

The CPU 31 of the machine 25 (through the interface 58 to the coin acceptor 58*a*, or the interface 59 to the currency acceptor 59*a*) registers a wager from the player to initiate play or post credits on a credit meter. Play proceeds in the FIG. 1 embodiment by the player touching the surface of the video monitor 60*a*, such that the touchscreen device 52*a* electrically coupled thereto causes instructions to be passed through the interface 52, to and through the bus 41, and ultimately to the CPU 31. The CPU 31 then operates according to the game software to arrive at an outcome. Here, the "video reels" show a video display that corresponds to the outcome selected by a random number generator (RNG) as is well known in the art. Alternatively, play could be initiated with the press of a button 51*a* through button interface 51.

The mechanical reel slot machine 29 of FIG. 2 is different from the FIG. 1 embodiment in having mechanical slot reels 62*a* driven by a stepper motor 62. It also has an LED meter interface 63 and related LED meters 63*a*.

Play in the FIG. 2 embodiment proceeds, for example, by the player pulling, engaging, or depressing the appropriate control 51*a* to operate the game program and arrive at an outcome. The stepper motor interface 62 causes the mechanical slot reels 62*a* to move to a position that corresponds to the outcome selected by a RNG, as indicated above.

In either of FIG. 1 or FIG. 2, when an outcome satisfies the pre-selected event, a historical record is produced from which a publishable record or refined publishable record is generated. The necessary control codes and graphic data are sent from the CPU 31 to the machine printer 56*a* in ways that are well known in the art. The result is production of a souvenir having the pre-selected form or forms at the machine (although it can be distributed according to another pre-selected distribution method as described herein). If the operator has chosen to generate the souvenir automatically, and without further input from the operator or player, the CPU 31 sends the necessary control codes and graphic data to the printer 56*a* via printer interface 56.

In those embodiments that permit selective manipulation by the operator, the entry of a souvenir generation command by an employee generates the souvenir. Embodiments of this system variation and method may require the unlocking of locked portions of the machine 25 or 29 for the entry of the souvenir generation command. The locked portion may be a portion of the program that is accessible after entry of a security code, such as through the touchscreen device 52*a*, or a portion of a cabinet that is physically locked with a conventional lock. As a further example, the attendant may insert or swipe a card in or through a slot for access to attendant functions. It is well known to those skilled in the art that large jackpots are often paid to players by an attendant through what is called a "hand pay" sequence in which the machine "locks up" upon generating the jackpot outcome and summons an attendant to verify the win and pay out the award. In embodiments that require attendant intervention, the interaction of the attendant with the machine to produce the souvenir could be integrated into this familiar "hand pay" sequence. The souvenir generation command may be as simple as the entry of a "yes" to the request whether a souvenir should be generated. If the command "yes" is entered, the CPU 31 sends the necessary control codes and graphic data to, for example, printer 56*a*, again in ways that are well known in the art.

In those embodiments of the system that permit the player to choose whether to have a souvenir generated, upon determination that the preprogrammed event occurred, the system queries the player whether the player wishes to have such souvenir generated. The query may be provided visually, such as on the machine display or elsewhere, and/or aurally. The query may simply require the entry of a "yes" answer to the question to generate the souvenir. As above, upon entry of the appropriate command, the CPU 31 sends the necessary control codes and graphic data to printer 56*a*.

In appropriate embodiments in which the operator has chosen to permit the operator and/or the player to add to the publishable record to produce a refined publishable record, the occurrence of the event triggers the visual and/or aural offering of, for example, the opportunity to the employee of the operator and/or the player. For example, in those embodiments that permit such selection, the player may be informed what, if any, choice the player has with respect to the information to be included on the souvenir and queried, again either visually and/or aurally, and whether the player wishes to add any information to the souvenir (that is, whether the player wishes to produce the refined publishable record described above). The player may choose to remove certain information from the souvenir record, in cases where the operator has configured the game to allow this. To facilitate the selection, an appropriate data entry menu may be made available to the player. The menu may appear on the screen of those embodiments that include a video monitor 60*a*. The operator and/or player may then add to the publishable record to produce the refined publishable record. The possible choices for information on the souvenir are limited to that which is in the publishable record or, in those embodiments that provide such a record, the refined publishable record as described above. The player would then be asked to enter the information and provide the souvenir generation command, such as through the use of the touchscreen 52*a* on the video display in the FIG. 1 embodiment or through the use of one or more buttons 51*a* in the FIG. 2 embodiment. As above, upon entry of the appropriate command, the CPU 31 sends the necessary control codes and graphic data to the printer in ways that are well known in the art.

The souvenir may be generated and be available for distribution to the player according to the pre-selections made by the operator. The embodiments illustrated in FIGS. 1 and 2 include a machine printer 56*a* or an online printer 70 that permit a "hardcopy" version of the souvenir to be produced at a location separate from the machine 25 or 29. Such printers may be immediately accessible by the operator's employee or the player, as desired, such that the souvenir may be distributed to the player generally immediately after generation. The embodiments illustrated in FIGS. 1 and 2 have printer 70 that is connected to the system 21 through a connection 75.

With respect to the embodiments configured to include an online system network 21, the machines 25 and 29 preferably include an online network interface 61, such as a serial RS-485, RS-422 or RS-232 connection, or a suitable interface including parallel, ethernet, USB, IEEE-1394, or other networking or communication interface. Machines 25, 29 are further preferably configured to communicate using the protocol of several different online systems, and the online network systems 21 are configured to accept the transmission of packets of data and graphics necessary to produce the souvenir. As in the previous embodiments, once the threshold event has been satisfied, the appropriate souvenir generation data and graphic information is available for further processing or dispatch over the local online network to other points including printers not forming an immediate component of the machine 25 or 29 and other network destinations such as on-site computers, remote computers or internet locations. The transmission may be sent also over various networks to employees of the operator or over the Internet directly to the player. In the case of data being sent directly to a distant printer at a computer (e.g., PC) 77 communicating by modem (or local or wide area network), the appropriate printer control data will be combined with the image data and published at the user's printer 79. This printout could then be held for player pickup or mailed to the player, for two examples of delivery. For other applications, the image data may be stored in the same or other forms such as a standard computer image format (for example BMP, JPEG, GIF, or TIF). In one embodiment, the data formatted for a printer is formatted into an appropriate online system packet and transmitted on the online network. This packet may include additional information including information that identifies the player obtained through the player's input on the machine or from the player's slot club card (which information is retrieved over the online network). A printer 70 on the network 21 receives the data and prints out the souvenir. The souvenir 80 may be mailed to the player (using the identification information) or may be available at a convenient location for the player, such as the slot club booth. The souvenir in digital form may be transmitted directly to the player's Internet email address, which was either entered by the player or operator employee immediately after the event was realized or obtained from data known by the operator from the player's pre-established account (through the online system). In such a case, the image data would be formatted into an online system packet that included the email address of the player and the instruction (i.e., a field in the online system packet) that this image file is to be emailed to the specified email address. Alternatively, the souvenir may be printed out or recorded on a disk that is distributed through conventional mail or delivery services to the player. Alternatively, to minimize traffic on the online system network, the slot machine could encode a packet containing minimal information, such as the player's identification and the winning event, and allowing a computer on the online network to use this information to construct a representation of the image for printout or transmission as described above.

In those embodiments that do not include printer components that are high resolution color, such as an ink jet, dye sublimation or other photo printer but instead a lower resolution color or black and white printer, (such as a dot-matrix or thermal printer), the CPU 31 is preferably configurable such that it can be selected to send the necessary control codes and graphic data to the printer in ways that are well known in the art to produce a recreation that is representative of the winning display instead of exactly reproducing or matching the display that the player observed. For example, if the machine 25 is one on which the player could play a video poker game, the player received a royal flush 81, and the printer was of much lower resolution than the video display, then, upon the determination that the royal flush had been won, the CPU 31 would draw from stock images of playing card images to reconstruct the same five card winning hand and form the historical record. The publishable record or refined publishable record may be formed from the historical record and the appropriate control codes and graphic data sent to, for example, a printer for printout or made available in digital form. Such a souvenir is a recreation representative of the winning event and not a generally exact reproduction.

Thus, while the invention has been described with respect to certain preferred embodiments, it will be understood by those of skill in the art that there are modifications, substitutions and other changes that can be made, yet will still fall within the intended scope of the invention, as set forth in the following claims.

What is claimed is:

1. An improved gaming machine wherein the improvement comprises: a souvenir generated by the gaming machine, said souvenir including a first record of a prize won by a player of the gaming machine and a second record of a reproduction of at least part of a display of a game played upon the gaming machine that yielded said prize.

2. The improved gaming machine of claim 1 wherein said improvement further comprises a reproduction including a photograph of said player.

3. The improved gaming machine of claim 1 wherein said improvement further comprises a camera associated with said gaming machine, said camera being actuable upon command to photograph said player, and a mechanism incorporating said photograph into a record which includes a reproduction of a display of a game played upon the gaming machine that yielded said prize.

4. The improved gaming machine of claim 1 wherein said improvement further comprises a printing apparatus associated with the gaming machine, said printing apparatus generating said souvenir at the respective gaming machine that yielded said prize.

5. The improved gaming machine of claim 1 wherein said improvement further comprises a printing apparatus located remote from the gaming machine, and an electronic communication connection between said gaming machine and said printing apparatus, the gaming machine producing data indicative of a record and sending said data to said printing apparatus via said communication connection for generation of said souvenir.

6. The improved gaming machine of claim 1 wherein said improvement further comprises a selection of formatting options for said record, and a device through which the player inputs commands to select among said options.

7. The improved gaming machine of claim 1 wherein said gaming machine includes a video display upon which the game is visually perceived, and said improvement comprises a reproduction that is a substantially exact replication of at least part of a display of a game played upon the gaming machine that yielded said prize.

8. A method of operating a gaming machine comprising the steps of:

providing a mechanism interacting with the gaming machine that generates a souvenir record of a game played upon the gaming machine, wherein said record comprises a reproduction of a display of at least part of a game played upon the gaming machine that yielded said prize;

and establishing at least one predetermined event upon which a souvenir is made available.

9. A method of operating a gaming machine comprising the steps of:

providing a mechanism associated with the gaming machine that generates a souvenir of a game played upon the gaming machine, wherein said souvenir comprises a reproduction of a display of at least part of a game played upon the gaming machine that yielded said prize;

establishing at least one predetermined event upon which a souvenir is made available;

generating said souvenir including a record of a prize won by a player of the gaming machine.

10. The method of claim 9 wherein said record comprises a reproduction including a photograph of said player.

11. The method of claim 9 wherein said mechanism includes a camera associated with said gaming machine, and further including the step of actuating said camera upon command to take a photograph of said player, and said step of generating said souvenir includes incorporating said photograph into a record which includes a representation of said prize.

12. The method of claim 11 wherein said representation of said prize includes a reproduction of at least part of a display of a game played upon the gaming machine that yielded said prize.

13. The method of claim 9 wherein said mechanism includes a printing apparatus associated with the gaming machine, said printing apparatus generating said souvenir at the respective gaming machine that yielded said prize.

14. The method of claim 9 wherein said mechanism includes a printing apparatus located remote from the gaming machine, and an electronic communication connection between said gaming machine and said printing apparatus, the gaming machine producing data indicative of a record and sending said data to said printing apparatus via said communication connection for generation of said souvenir.

15. The method of claim 9 wherein said gaming machine includes a video display upon which the game is visually perceived, and said record includes a reproduction that is a substantially exact replication of at least part of a display of a game played upon the gaming machine that yielded said prize.

16. A system for operating a gaming machine, comprising:

a gaming machine having a game which a player plays;

a wagering device on said gaming machine having an input for a wager placed by the player upon said game;

an operating apparatus for said gaming machine including an input mechanism actuating said game upon command from the player; and a souvenir generating mechanism that generates a souvenir of a game played upon said gaming machine, said souvenir mechanism being operable upon achievement of a predetermined event by the player, said souvenir including a record of said predetermined event.

17. The system of claim 16 wherein said record comprises a representation of at least part of a display of a game played upon the gaming machine that yielded said event.

18. The system of claim 17 wherein said gaming machine further includes an apparatus for taking a photographic image of the player, and said record includes a reproduction including a photograph of the player.

19. The system of claim 16 wherein said souvenir mechanism includes a camera associated with said gaming machine, and further including a camera actuating input device for said camera operable upon command to photograph the player, and said souvenir mechanism further incorporates said photograph into a record that includes a representation of said event.

20. The system of claim 17 wherein said representation of said event includes a reproduction of the entire display of a game played upon the gaming machine that yielded said event.

21. The system of claim 17 wherein said souvenir mechanism includes a printing apparatus associated with the gaming machine, said printing apparatus generating said souvenir at the respective gaming machine that yielded said event.

22. The system of claim 17 wherein said souvenir mechanism includes a printing apparatus located remote from the gaming machine, and an electronic communication connection between said gaming machine and said printing apparatus, said gaming machine producing data indicative of a record and sending said data to said printing apparatus via said communication connection for generation of said souvenir.

23. The system of claim 17 further including a selection of formatting options for said record, and a format selecting device through which the player inputs commands to select among said options.

24. The system of claim 16 wherein said gaming machine includes a video display upon which the game is visually perceived, and said record includes a reproduction that is a substantially exact replication of at least part of a display of a game played upon the gaming machine that yielded said event.

25. The system of claim 17 wherein said event is achievement of a predetermined jackpot level.

26. The system of claim 17 wherein said event is winning of a predetermined non-monetary prize.

27. The system of claim 17 wherein said event is achievement of a predetermined monetary prize.

28. The system of claim 17 wherein said event is a preselected gaming outcome.

29. An apparatus providing a memento of a game played on a gaming machine, comprising:

a souvenir generating mechanism;

a connecting device adapted to electronically communicate game data to said souvenir-generating mechanism including game data of an event to be incorporated into and memorialized as a souvenir.

30. The apparatus of claim 29 wherein said game data includes information to yield a reproduction of at least part of a display of a game played upon the gaming machine that resulted in said event.

31. The apparatus of claim 29 wherein said souvenir generating mechanism further includes a device for taking a photograph of the player of the game, and said souvenir generating mechanism incorporates said photograph of the player in said souvenir.

32. The apparatus of claim 29 wherein said souvenir generating mechanism further comprises a camera, an input device to actuate said camera upon command to photograph the player, and a photograph melding mechanism incorporating said photograph into a record which includes a reproduction at least part of a display of a game played upon the gaming machine that yielded said event.

33. The apparatus of claim 29 wherein said souvenir generating mechanism further comprises a printing apparatus, said printing apparatus generating said souvenir at the respective gaming machine that yielded the event.

34. The apparatus of claim 30 where in said souvenir generating mechanism further comprises a printing apparatus located remote from the gaming machine, and an electronic communication connection between said souvenir generating mechanism and said printing apparatus.

35. The apparatus of claim 29 wherein said souvenir generating mechanism further comprises a selection of formatting options for said souvenir, and a device through which the player inputs commands to select among said options.

36. The improved gaming machine of claim 1 wherein said souvenir is provided as a digital record which is electronically communicated to the player.

37. The method of claim 9 wherein said souvenir is provided as a digital record which is electronically communicated to the player.

38. The system of claim 17 wherein said souvenir is provided as a digital record which is electronically communicated to the player.

39. The apparatus of claim 30 wherein said souvenir is provided as a digital record which is electronically communicated to the player.

40. The method of claim 9 wherein said souvenir is provided in the form of a document.

41. The method of claim 9 wherein said souvenir is provided in the form of a drinking utensil.

42. The method of claim 9 wherein said souvenir is provided in the form of an article of clothing.

43. The method of claim 14 wherein said souvenir is provided in the form of a document.

44. The method of claim 14 wherein said souvenir is provided in the form of a drinking utensil.

45. The method of claim 14 wherein said souvenir is provided in the form of an article of clothing.

46. The system of claim 17 wherein said souvenir is provided in the form of a document.

47. The system of claim 17 wherein said souvenir is provided in the form of a drinking utensil.

48. The system of claim 17 wherein said souvenir is provided in the form of an article of clothing.

49. The system of claim 22 wherein said souvenir is provided in the form of a document.

50. The system of claim 22 wherein said souvenir is provided in the form of a drinking utensil.

51. The system of claim 22 wherein said souvenir is provided in the form of an article of clothing.

52. The apparatus of claim 30 wherein said souvenir is provided in the form of a document.

53. The apparatus of claim 30 wherein said souvenir is provided in the form of a drinking utensil.

54. The apparatus of claim 30 wherein said souvenir is provided in the form of an article of clothing.

55. The apparatus of claim 34 wherein said souvenir is provided in the form of a document.

56. The apparatus of claim 34 wherein said souvenir is provided in the form of a drinking utensil.

57. The apparatus of claim 34 wherein said souvenir is provided in the form of an article of clothing.

58. The method of claim 11 wherein said souvenir is one of a group comprising a keychain, paperweight, decorative item, poster, plaque, post card, toy and ashtray.

59. The method of claim 14 wherein said souvenir is one of a group comprising a keychain, paperweight, decorative item, poster, plaque, post card, toy and ashtray.

60. The system of claim 17 wherein said souvenir is one of a group comprising a keychain, paperweight, decorative item, poster, plaque, post card, toy and ashtray.

61. The system of claim 22 wherein said souvenir is one of a group comprising a keychain, paperweight, decorative item, poster, plaque, post card, toy and ashtray.

62. The apparatus of claim 30 wherein said souvenir is one of a group comprising a keychain, paperweight, decorative item, poster, plaque, post card, toy and ashtray.

63. The apparatus of claim 34 wherein said souvenir is one of a group comprising a keychain, paperweight, decorative item, poster, plaque, post card, toy and ashtray.

64. The souvenir generated by any one of the methods of claims 9 through 15 and 40 through 45.

65. An apparatus providing a memento of a game played on a gaming machine, comprising:

a souvenir generating mechanism;

a connecting device adapted to electronically communicate game data to said souvenir-generating mechanism including game data of an event to be incorporated into and memorialized as a souvenir, wherein said gaming machine includes a video display upon which the game is visually perceived, and souvenir-generating mechanism includes reproducing a visual image that is a substantially exact replication of at least part of a display of a game played upon the gaming machine that yielded the event.

66. A method of operating a gaming machine comprising the steps of:

providing a mechanism associated with the gaming machine that generates a souvenir of a game played upon the gaming machine;

establishing at least one predetermined event upon which a souvenir is made available;

generating said souvenir including a record of a prize won by a player of the gaming machine; and providing a selection of formatting options for said record, and a device through which the player inputs commands to select among said options.

* * * * *